United States Patent [19]

Oishi

[11] Patent Number: 5,680,284
[45] Date of Patent: Oct. 21, 1997

[54] CENTER CORE AND SHUTTER FOR A HIGH DENSITY MAGNETIC DISK CARTRIDGE

[75] Inventor: Kengo Oishi, Kanagawa-ken, Japan

[73] Assignee: Fuji Photo Film Co., Ltd., Japan

[21] Appl. No.: 667,500

[22] Filed: Jun. 21, 1996

[30] Foreign Application Priority Data

Jun. 23, 1995 [JP] Japan .................. 7-157569

[51] Int. Cl.⁶ .................................................. G11B 23/03
[52] U.S. Cl. .................................................. 360/133
[58] Field of Search .................................................. 360/133

[56] References Cited

U.S. PATENT DOCUMENTS

| | | | |
|---|---|---|---|
| 4,812,937 | 3/1989 | Nemoto et al. | 360/133 |
| 4,825,314 | 4/1989 | Maekawa et al. | 360/99.08 |
| 4,827,468 | 5/1989 | Odawara et al. | 360/133 X |
| 4,920,441 | 4/1990 | Kimura et al. | 360/133 |
| 5,214,555 | 5/1993 | Hughes | 360/133 |
| 5,297,133 | 3/1994 | Otsuka et al. | 360/133 X |

*Primary Examiner*—John H. Wolff
*Attorney, Agent, or Firm*—Brinks Hofer Gilson & Lione

[57] ABSTRACT

A magnetic disk cartridge includes a magnetic disk sheet, a center core which holds the magnetic disk sheet and is provided with a spindle insertion hole at a center portion thereof and with a drive pin insertion cutaway portion spaced from the spindle insertion hole, and a casing which contains therein the magnetic disk sheet and the center core for rotation. The magnetic disk cartridge is loaded in a disk drive system having a rotary support table which magnetically attracts thereagainst the center core, a spindle which is circular in cross-section and is inserted into the spindle insertion hole, and a drive pin which is inserted into the drive pin insertion cutaway portion and is moved radially outward when the rotary support table is rotated. The spindle insertion hole is circular in shape and is adapted to be tightly fitted on the spindle of the disk drive system. The drive pin insertion cutaway portion extends radially outward to a position where the drive pin cannot reach the radially outer wall of the cutaway portion when the drive pin is moved radially outward in response to rotation of the rotary support table.

5 Claims, 6 Drawing Sheets

CENTER CORE AND SHUTTER FOR A HIGH DENSITY MAGNETIC DISK CARTRIDGE

BACKGROUND OF THE INVENTION

1. Field of the Invention

This invention relates to a magnetic disk cartridge which comprises a magnetic disk contained in a casing and is used in a magnetic recording and reproduction in which the magnetic disk is rotated at high speed, and more particularly to such a magnetic disk cartridge which is driven by a disk drive system in common with another magnetic disk cartridge having a smaller storage capacity.

2. Description of the Related Art

There has been known a magnetic disk, a so-called floppy disk, which comprises magnetic layers formed on opposite sides of a flexible disk base of a polyester sheet or the like. Information is recorded on the floppy disk by a magnetic head while rotating the floppy disk at high speed. Such floppy disks have been mainly used as recording media for computers because they are easy to handle and available at low cost.

Recently the magnetic disk of this type is generally held for rotation in a small hard casing and used in the form of a magnetic disk cartridge as represented by a 3.5-inch floppy disk.

There has been constant demand for a magnetic disk cartridge having a larger storage capacity and 3.5-inch floppy disks having a storage capacity of 1 MB or 2 MB have been put into practice. Further even 3.5-inch floppy disks, having a storage capacity of not smaller than 100 MB have been provided.

When the conventional magnetic disk cartridge such as 3.5-inch floppy disks is loaded in a disk drive system, a center core holding the magnetic disk is generally held against a rotary support table in the disk drive system by magnetic attraction. The center core of the magnetic disk is provided at the center thereof with a spindle insertion hole which is rectangular in cross-section and in which a spindle of the disk drive system having a circular cross-section is loosely fitted, and a cutaway portion into which a drive pin of the disk drive system is inserted is formed in the center core spaced from the spindle insertion hole. When the rotary support table is rotated, the drive pin is moved radially outward to be brought into contact with the outer wall of the cutaway portion, and the rotational axis of the center core is positioned by the drive pin and the spindle.

When a magnetic disk cartridge larger than conventional magnetic disk cartridges in storage capacity is developed, a novel disk drive system for driving the magnetic disk cartridge having a larger storage capacity is sometimes provided. Such a novel disk drive system is generally arranged to be able to drive magnetic disk cartridges having smaller storage capacities as well as the newly developed larger capacity magnetic disk cartridge. Such capability of driving magnetic disk cartridges having smaller storage capacities as well as the newly developed larger capacity magnetic disk cartridge will be referred to as "downward compatibilities", hereinbelow.

In order to drive the conventional magnetic disk cartridges having smaller storage capacities, the novel disk drive system with the downward compatibilities has to be arranged to position the rotational axis of the center core by the aforesaid spindle and the drive pin. However such a positioning mechanism is disadvantageous in that it is not so high in the positioning accuracy.

Practically this does not give rise to so serious problem for the smaller storage capacity magnetic disk cartridges, but for the larger storage capacity magnetic disk cartridges having, for instance a storage capacity of not smaller than 100 MB, this can give rise to a serious problem such as deterioration in the tracking accuracy and the like which obstructs practical use of such a larger capacity magnetic disk cartridge.

SUMMARY OF THE INVENTION

In view of the foregoing observations and description, the primary object of the present invention is to provide a magnetic disk cartridge which can be driven by a disk drive system common with a magnetic disk cartridge having a smaller storage capacity and in which the rotational axis of the center core can be accurately positioned.

In accordance with the present invention, there is provided a magnetic disk cartridge which comprises a magnetic disk sheet, a center core which holds the magnetic disk sheet and is provided with a spindle insertion hole at a center portion thereof and with a drive pin insertion cutaway portion spaced from the spindle insertion hole, and a casing which contains therein the magnetic disk sheet and the center core for rotation, and is loaded in a disk drive system having a rotary support table which holds thereagainst the center core by magnetic attraction, a spindle which is circular in cross-section and is inserted into the spindle insertion hole, and a drive pin which is inserted into the drive pin insertion cutaway portion and is movable radially outward up to a predetermined position when the rotary support table is rotated, wherein the improvement comprises that said spindle insertion hole is circular in shape and is adapted to be tightly fitted on the spindle of the disk drive system, and said drive pin insertion cutaway portion extends radially outward beyond said predetermined position to which said drive pin is movable in response to rotation of the rotary support table so that the drive pin cannot reach the radially outer wall of the cutaway portion when the drive pin is moved radially outward.

When the center core is like a hat in cross-section and comprises a cylindrical portion with a closed end and a collar portion which extends radially outward from the cylindrical portion and to which the magnetic disk sheet is bonded, it is preferred that the cutaway portion be formed to extend from the closed end face of the cylindrical portion to the side wall portion thereof, In the magnetic disk cartridge of the present invention, since the drive pin insertion cutaway portion extends radially outward to a position where the drive pin cannot reach the radially outer wall of the cutaway portion when the drive pin is moved radially outward in response to rotation of the rotary support table, the drive pin does not concern in positioning of the rotational axis of the center core. That is, in the magnetic disk cartridge of the present invention, the rotational axis of the center core is positioned by tightly fitting the .spindle, which is circular in cross-section, in the circular spindle insertion hole. The rotational axis of the center core can be very accurately positioned in such a positioning way.

Though not concerning in positioning of the rotational axis of the center core, the drive pin is rotated with the rotary support table and pushes the center core in a circumferential direction, thereby rotating the center core and accordingly the magnetic disk sheet.

As can be understood from the description above, the magnetic disk cartridge of the present invention can be driven by a disk drive system having a common drive pin. Accordingly when a conventional small capacity magnetic disk cartridge is loaded in the disk drive system, the rotational axis of the center core is positioned and the center core is driven in the known manner. That is, the magnetic disk cartridge of the present invention can be driven by a disk drive system common with a magnetic disk cartridge having a smaller storage capacity.

DESCRIPTION OF THE PREFERRED EMBODIMENT

Figure 1:
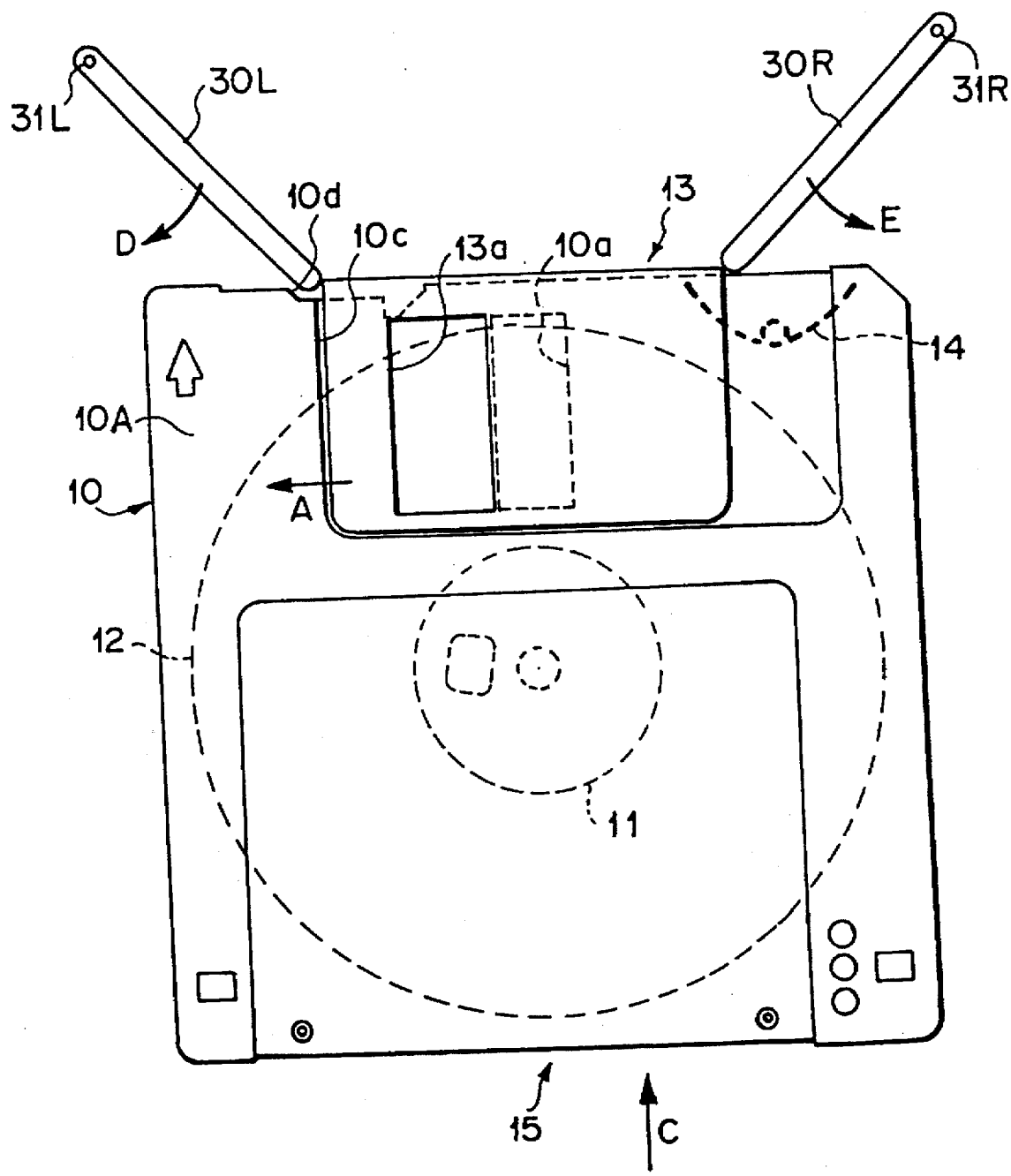
FIG. 1 is a plan view showing a front side of a magnetic disk cartridge in accordance with a first embodiment of the present invention.
Figure 2:
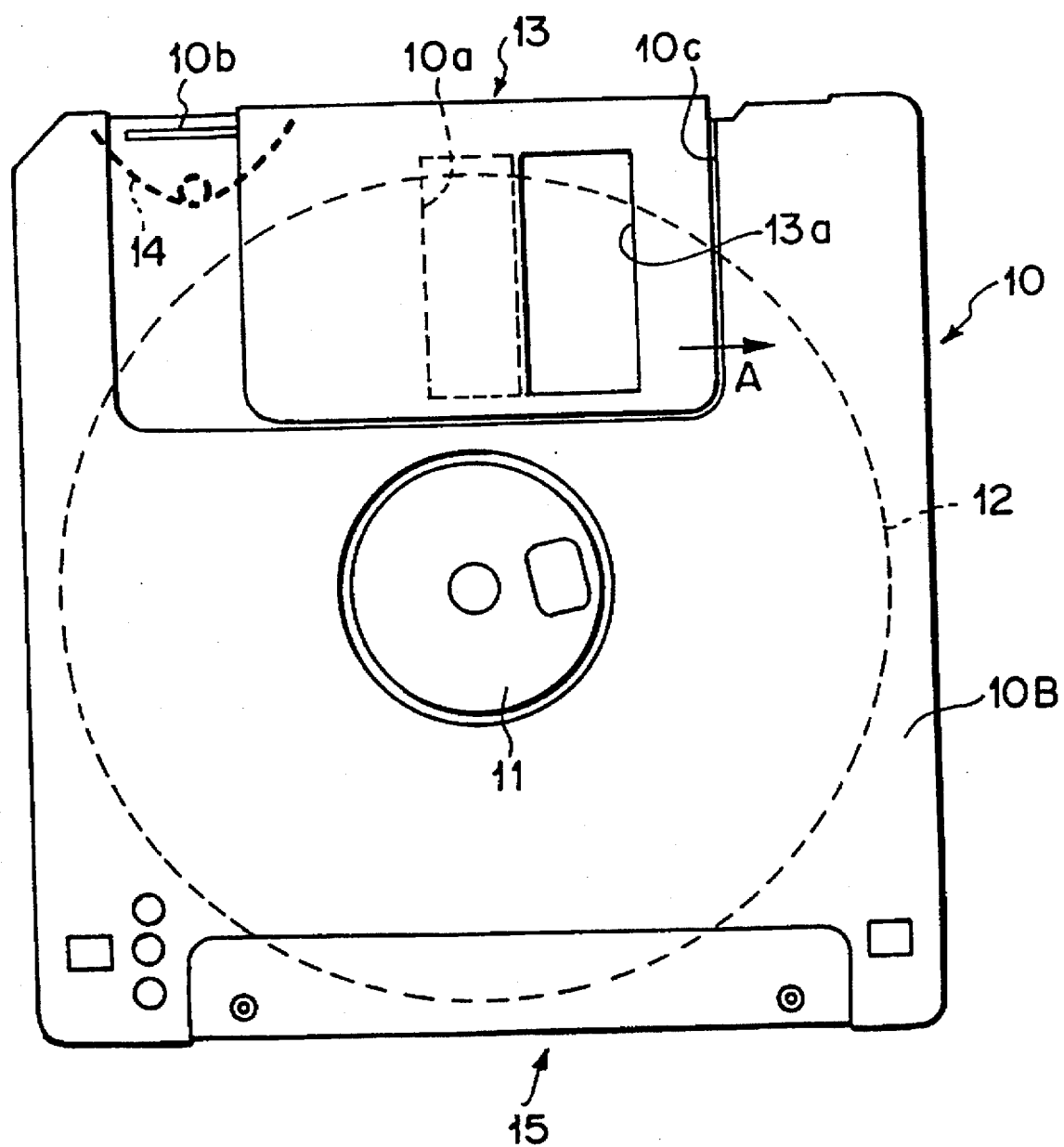
FIG. 2 is a plan view showing a rear side of the magnetic disk cartridge.
Figure 3:
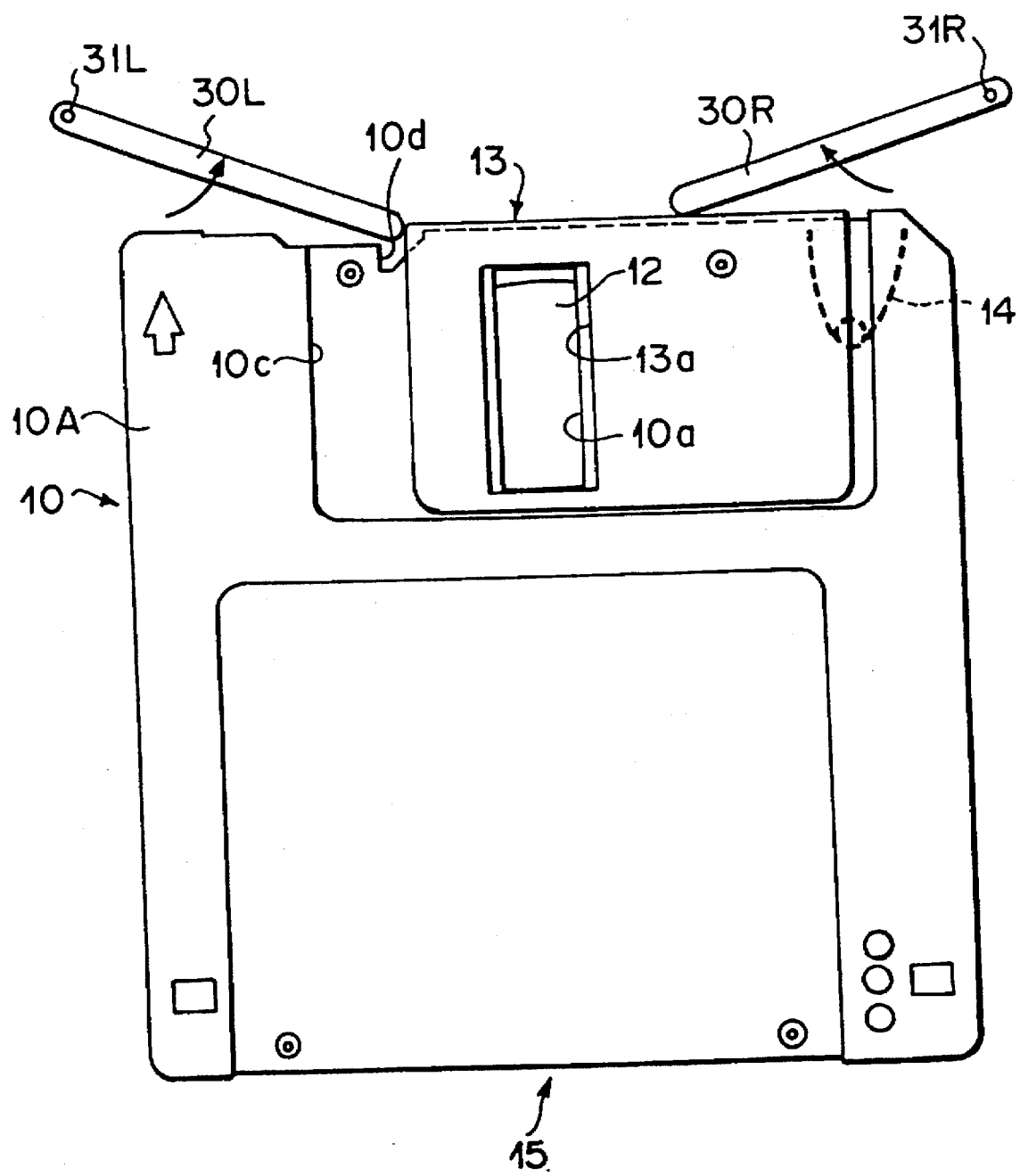
FIG. 3 is a plan view showing a state where the magnetic disk cartridge is loaded in a disk drive system having the downward compatibilities.

In FIGS. 1 and 2, a magnetic disk cartridge 15 in accordance with a first embodiment of the present invention has a hard casing 10 formed of, for instance, synthetic resin. A center core 11 is held for rotation in the casing 10 and a magnetic disk sheet 12 having a central opening is bonded to the center core 11. The magnetic disk sheet 12 comprises magnetic layers formed on opposite sides of a flexible disk base of a polyester sheet or the like.

The hard casing 10 comprises a pair of shell halves 10A and 10B mated together, and each of the shell halves 10A and 10B is provided with an opening 10a (will be referred to as "head insertion opening 10a", hereinbelow) which gives a magnetic head access to the magnetic disk 12. A shutter 13 is mounted on the hard casing 10 to be slidable left and right with its engagement portion (not shown) in engagement with a guide groove 10b formed on the shell half 10B. The shutter 13 is formed of stainless steel, aluminum or plastic such as polyacetal resin and is like a channel in cross-section. The shutter 13 is mounted to cover upper parts of the shell halves 10A and 10B from outside. The part of the shutter 13 opposed to the shell half 10A and the part of the same opposed to the shell half 10B are respectively provided with openings 13a.

The shutter 13 is urged in the direction of arrow A by a torsion spring 14 which is engaged with the hard casing 10 at one end thereof and with the shutter 13 at the other end thereof. The shutter 13 is in abutment against shoulders 10c formed in the shell halves 10A and 10B and is normally held in closing position shown in FIGS. 1 and 2. The openings 13a in the shutter 13 are positioned so that they are out of alignment with the head insertion openings 10a in the shell halves 10A and 16B when the shutter 13 is in the closing position. That is, normally the head insertion openings 10a are closed by the shutter 13 so that foreign matters such dust cannot enter the hard casing 10.

Though the magnetic disk cartridge 15 of this embodiment is a so-called 3.5-inch magnetic disk cartridge, it have a storage capacity of 128 MB which is much larger than those of conventional 3.5-inch magnetic disk cartridges.

Figure 4:
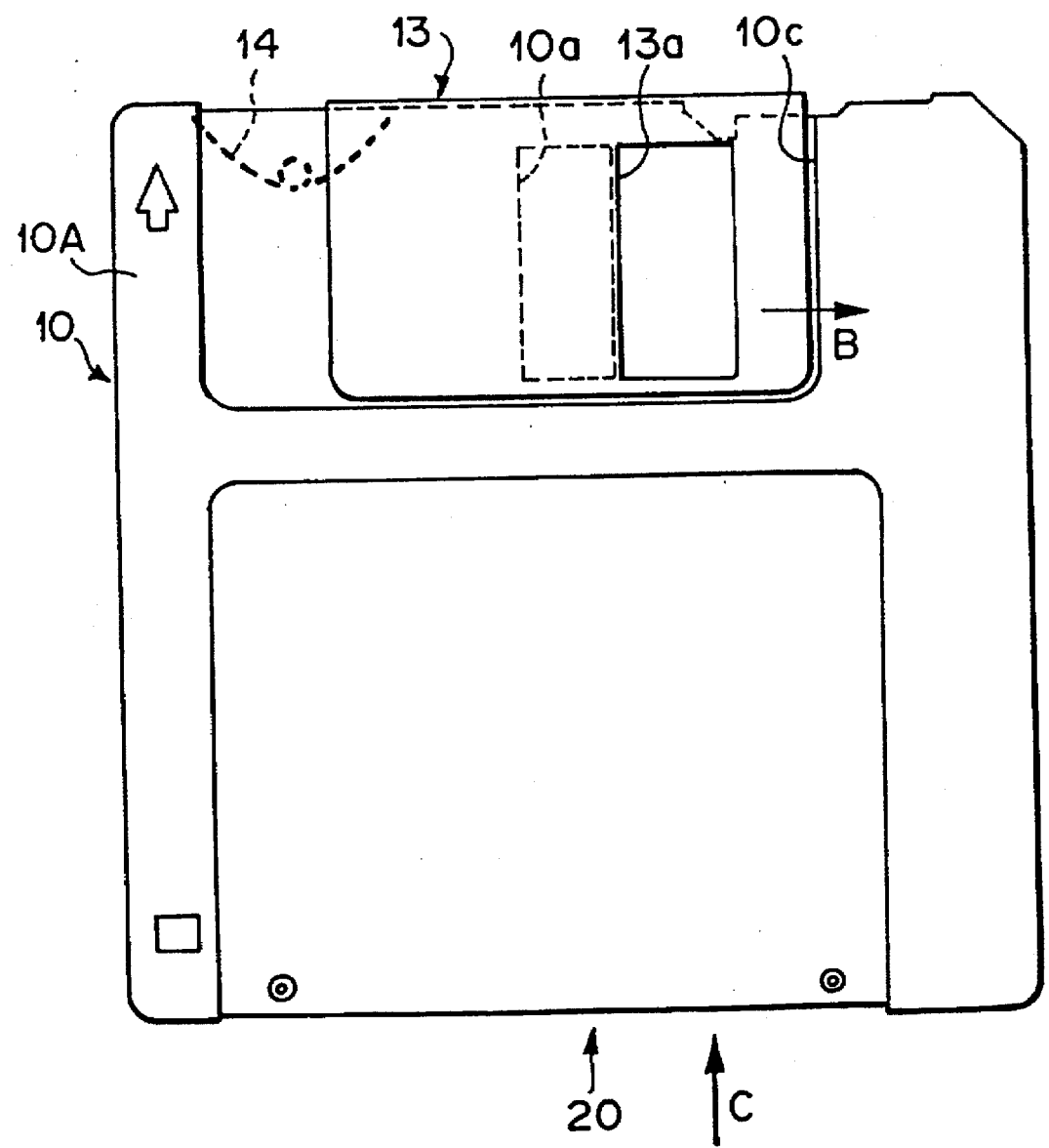
FIG. 4 is a plan view of the conventional magnetic disk cartridge having a smaller storage capacity which can be loaded in the disk drive system shown in FIG. 3.

FIG. 4 shows a conventional 3.5-inch magnetic disk cartridge 20 having a storage capacity of, for instance, 1 MB as seen from the front side thereof. In FIG. 4, the center core and the magnetic disk are omitted and the elements analogous to those shown in FIGS. 1 and 2 are given the same reference numerals and will not be described here.

As can be seen from comparison of FIG. 1 and FIG. 4, the magnetic disk cartridge 15 of this embodiment is substantially the same as the conventional magnetic disk cartridge 20 in profile but differs from the conventional magnetic disk cartridge 20 in that the direction in which the shutter 13 is urged is opposite to that in the conventional magnetic disk cartridge 20. That is, as shown in FIG. 4, as in all the conventional 3.5-inch magnetic disk cartridges, in the magnetic disk cartridge 20 relatively small in storage capacity, the shutter 13 is urged in the direction of arrow B by a torsion spring 14.

The magnetic disk cartridge 15 of this embodiment further differs from the conventional magnetic disk cartridge 20 in shape of the center core 11 as will be described in detail later.

The magnetic disk cartridge 15 of this embodiment is driven by a disk drive system having the downward compatibilities. That is, the magnetic disk cartridge 15 of this embodiment is driven by a disk drive system having left and right shutter opening members 30L and 30R as shown in FIG. 1. The shutter opening members 30L and 30R are held for rotation respectively about pivot pins 31L and 31R and are urged respectively in the directions of arrows D and E by urging means not shown.

The magnetic disk cartridge 15 is inserted into the disk drive system in the direction of arrow C in FIG. 1. When the magnetic disk cartridge 15 is pushed inward, the shutter opening members 30L and 30R are rotated in the directions opposite to the directions of arrows D and E. At this time, the free end of the left shutter opening member 30L is brought into engagement with the left edge of the shutter 13 by virtue of a small recess 10d formed on the hard casing 10. When the shutter opening member 30L is rotated with its free end engaged with the shutter 13, the shutter 13 is moved rightward in FIG. 1 overcoming the force of the spring When the magnetic disk cartridge 15 is inserted to a predetermined position, the shutter 13 is moved to an opening position where the openings 13a are aligned with the head insertion openings 10a in the hard casing 10. In this state, a magnetic head has access to the magnetic disk 12 for recording or reproduction of information.

When the shutter 13 is opened in the manner described above, the right shutter opening member 30R slides on the upper end face of the shutter 13 and does not prevent opening of the shutter 13.

When the magnetic disk cartridge 20 shown in FIG. 4 is loaded in the same disk drive system, the free end of the right shutter opening member 30R is brought into engagement with the right edge of the shutter 13 and moves the shutter 13 leftward in FIG. 4, whereby the shutter 13 is opened. At this time, the left shutter opening member 30L slides on the upper end face of the shutter 13 and does not prevent opening of the shutter 13.

Figure 5:
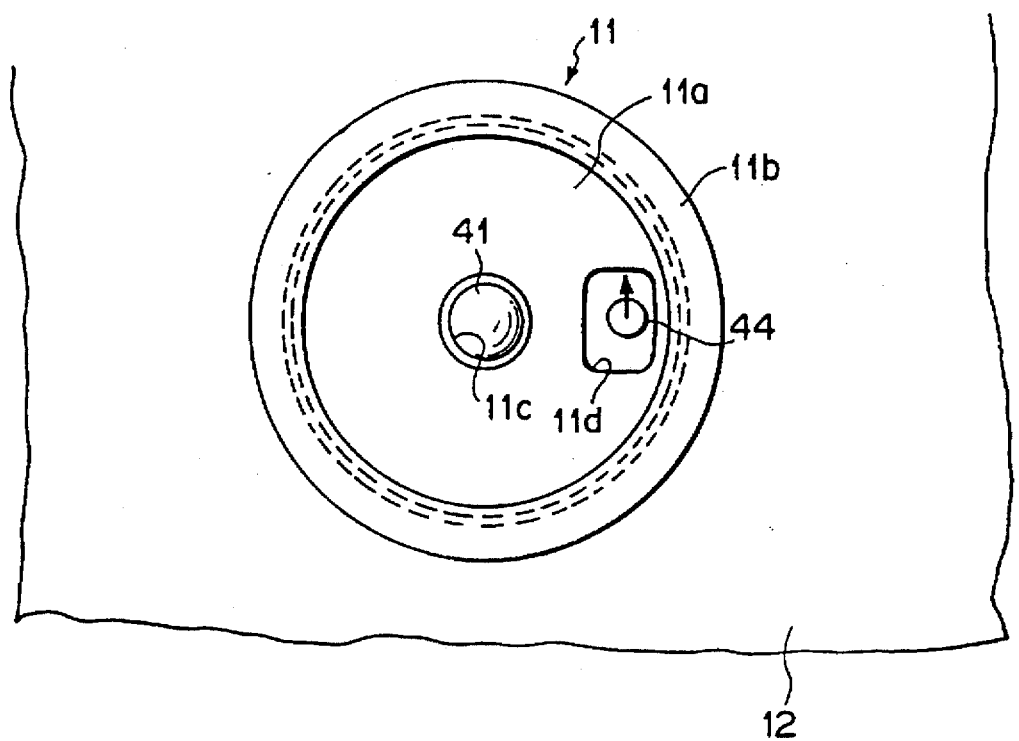
FIG. 5 is a fragmentary plan view showing an important part of the magnetic disk cartridge of the first embodiment.

The shape of the center core 11 and drive of the center core 11 by the disk drive system will be described in detail with reference to FIGS. 5 and 6, hereinbelow. FIG. 5 shows the center core held by the disk drive system as seen from the front side of the cartridge and FIG. 6 is a side view of the same.

The center core 11 is, for instance, of a stainless steel plate. The center core 11 is like a hat in cross-section and comprises a thin cylindrical portion 11a with a closed end and a collar portion 11b which extends radially outward from the cylindrical portion 11a and to which a part of the magnetic disk sheet 12 circumscribing the central opening is bonded. A circular spindle insertion hole 11c and a rectangular cutaway portion 11d are formed in the closed end face of the cylindrical portion 11a. The spindle insertion hole 11c is co-axial with the center core 11.

The disk drive system is provided with a rotary support table 40 for rotating the center core 11. The rotary support table 40 comprises a substantially cylindrical spindle 41 having a rounded tip, a support portion 42 in the form of a thin cylinder with a closed end which supports the center core 11, a rotational shaft 43 which is formed integrally with the spindle 41 and the support portion 42 co-axially therewith, a drive pin 44 mounted on the support portion 42 by way of a resilient member 45 and a plurality of magnets 46 disposed in the support portion 42 at intervals in the circumferential direction thereof.

Figure 6:
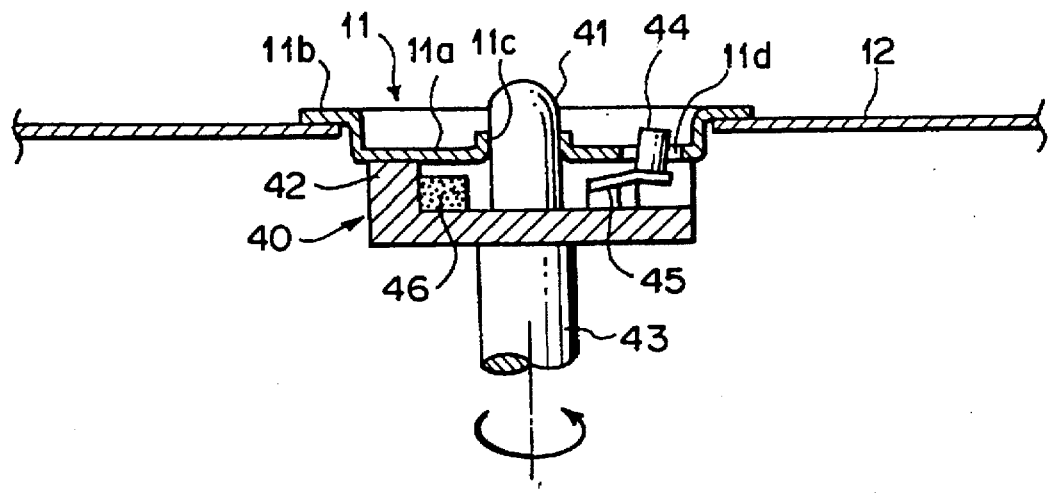
FIG. 6 is a fragmentary side view partly cutaway showing an important part of the magnetic disk cartridge of the first embodiment.

When the magnetic disk cartridge 15 is loaded in the disk drive system, the rotary support table 40 is first moved upward (as seen in FIG. 6) from below and the spindle 41 is inserted into the spindle insertion hole 11c in the center core 11. Then the center core 11 is attracted against the support portion 42 under the magnetic force of the magnets When the drive pin 44 is in alignment with the cutaway portion 11d of the center core 11 at this time, the drive pin 44 is inserted into the cutaway portion 11d. On the other hand, when the drive pin 44 is out of alignment with the cutaway portion 11d of the center core 11 at this time, the resilient member 45 is resiliently deformed with the drive pin 44 pressed against the center core 11 and when the rotary support table 40 is rotated, the drive pin 44 is rotated relative to the center core 11 to be inserted into the cutaway portion 11d. As the rotary support table 40 keeps rotating, the drive pin 44 is rotated relative to the cutaway portion 11d in the direction of the arrow in FIG. 5 to abut against the side wall portion of the cutaway portion 11d and comes to push the wall portion in the direction of the arrow, thereby rotating the center core 11. Thus the magnetic disk sheet 12 is rotated at a high speed.

Further, in response to rotation of the rotary support table 40, the drive pin 44 moves radially outward under a centrifugal force. The cutaway portion 11d is elongated radially outward so that the drive pin 44 cannot be brought into contact with the radially outer wall portion of the cutaway portion 11d. Accordingly, the center core 11 basically receives no radial force from the drive pin 44, and the rotational axis of the center core 11 is positioned solely by said engagement of the spindle 41 with the spindle insertion hole 11c.

The spindle insertion hole 11c has an inner diameter slightly larger than the outer diameter of the spindle 41 and is tightly fitted on the spindle 41, whereby the rotational axis of the center core 11 is aligned with the rotational axis of the spindle 41 with a very high accuracy.

Figure 8:
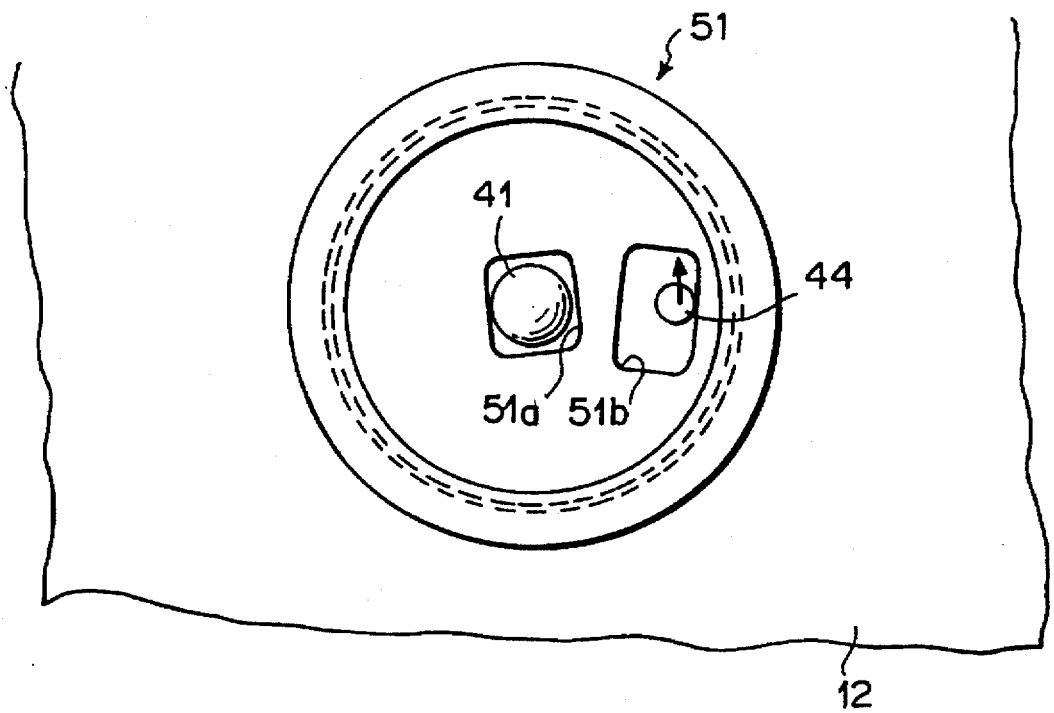
FIG. 8 is a fragmentary plan view showing an important part of the conventional magnetic disk cartridge having a smaller storage capacity.

Though not concerning in positioning of the rotational axis of the center core 11 when the magnetic disk cartridge 15 is loaded as described above, the drive pin 44 plays a role in positioning the rotational axis of the center core when a conventional small storage capacity magnetic disk cartridge 20 is loaded as shown in FIG. 8.

The center core 51 holding the magnetic disk sheet 12 in the conventional magnetic disk cartridge 20 is like a hat in cross-section as the center core 11 of the magnetic disk cartridge 15 of the embodiment described above. The center core 51 is provided with a substantially square spindle insertion hole 51a at the center thereof and with a cutaway portion 51b spaced from the spindle insertion hole 51a as shown in FIG. 8.

The spindle insertion hole 51a is relatively large and the spindle 41 is loosely fitted in the spindle insertion hole 51a. The cutaway portion 51b is formed so that the drive pin 44 is brought into abutment against the radially outer wall portion of the cutaway portion 51b when the drive pin 44 is moved radially outward under a centrifugal force. Accordingly, in this case, the rotational axis of the center core 51 is positioned by the spindle 41 supporting the center core 51 which is urged outward by the drive pin 44. Such positioning of the rotational axis of the center core 51 has been in wide use for the conventional 3.5-inch magnetic disk cartridges having a small storage capacity and gives rise to no problem in such small capacity magnetic disk cartridges.

Figure 7:
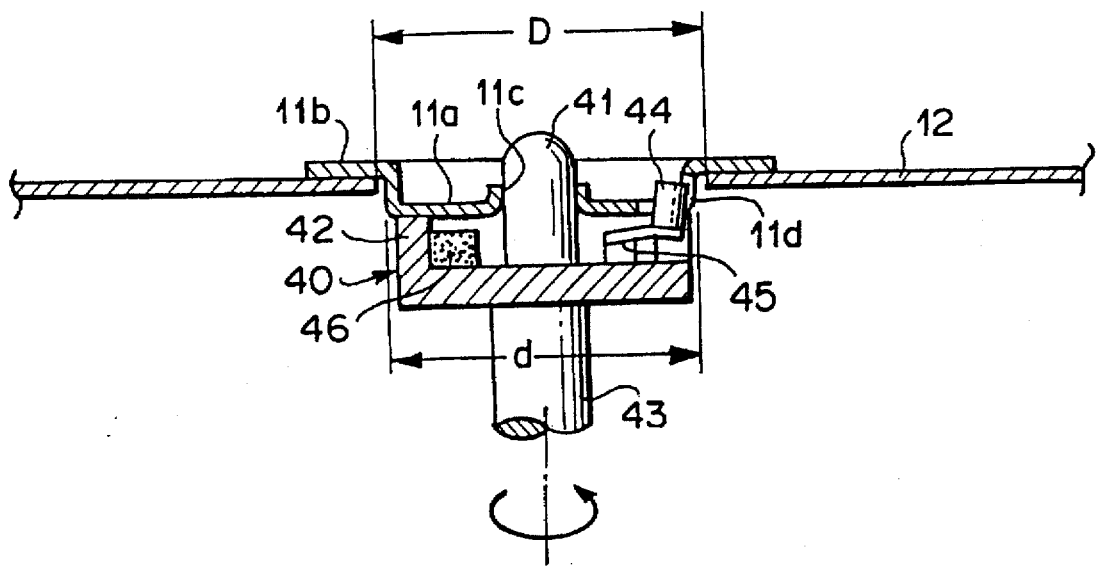
FIG. 7 is a fragmentary side view partly cutaway showing an important part of a magnetic disk cartridge of a second embodiment.

A second embodiment of the present invention will be described with reference to FIG. 7, hereinbelow. In FIG. 7, the elements analogous to those in FIG. 6 are given the same reference numerals and will not be described here.

Also in this embodiment, the center core 11 is like a hat in cross-section and a circular spindle insertion hole 11c and a cutaway portion 11d are formed in the closed end face of the cylindrical portion 11a. The spindle insertion hole 11c is the same in shape as that of the first embodiment. However the cutaway portion 11d is formed to extend from the closed end face of the cylindrical portion 11a to the side wall portion thereof.

When the cutaway portion 11d is formed in this manner, the outer diameter d of the cylindrical portion 11a may be smaller as compared with the shape of the cutaway portion of the first embodiment so long as the outermost position of the drive pin 44 is the same, whereby the diameter D of the central opening of the magnetic disk sheet 12 can be reduced and the recording area of the magnetic disk sheet 12 can be widened, which is advantageous in increasing the storage capacity of the magnetic disk cartridge.

Though, in the first and second embodiments described above, only one cutaway portion 11d is provided, a plurality of cutaway portions may be provided at desired intervals in the circumferential direction of the center core 11.

What is claimed is:

1. A magnetic disk cartridge which comprises a magnetic disk sheet, a center core which holds the magnetic disk sheet and is provided with a spindle insertion hole at a center portion thereof and with a drive pin insertion cutaway portion spaced from the spindle insertion hole, and a casing which contains therein the magnetic disk sheet and the center core for rotation, and is loaded in a disk drive system having a rotary support table which holds thereagainst the center core, a spindle which is circular in cross-section and is inserted into the spindle insertion hole, and a drive pin attached to the rotary support table via a resilient member, the drive pin inserted into the drive pin insertion cutaway portion and movable radially outward up to a predetermined position when the rotary support table is rotated, wherein the improvement comprises that said spindle insertion hole is circular in shape and is adapted to be tightly fitted on the spindle of the disk drive system, and said drive pin insertion cutaway portion extends radially outward beyond said predetermined position to which said drive pin is movable in response to rotation of the rotary support table so that the drive pin cannot reach the radially outer wall of the cutaway portion when the drive pin is moved radially outward.

2. A magnetic disk cartridge as defined in claim 1 in which said center core comprises a cylindrical sidewall portion with a closed end face at a first end and a collar portion at a second end which extends radially outward from the cylindrical sidewall portion and to which the magnetic disk sheet is bonded, and said cutaway portion is formed to extend from the closed end face of the cylindrical portion to the side wall portion thereof.

3. A magnetic disk cartridge as defined in claim 1 in which said casing has a shutter for closing an opening which gives a magnetic head access to the magnetic disk sheet, the shutter being urged toward its closing position from right to left by a spring when the magnetic disk cartridge is viewed from a top side with the shutter towards the disk drive system, wherein the shutter closes in a direction opposite to that of a shutter in a conventional 3.5 inch, 1 MB magnetic disk cartridge.

4. The magnetic disk cartridge as defined in claim 1, wherein an inner diameter of the spindle insertion hole is larger than an outer diameter of the spindle such that the spindle insertion hole is tightly fitted on the spindle and a rotational axis of the center core is accurately aligned with a rotational axis of the spindle.

5. A method of loading a magnetic disk cartridge in a magnetic recording and reproducing device, the method comprising the steps of:

providing a magnetic disk cartridge having a center core with a cutaway portion for receiving a drive pin and a circular spindle insertion hole adapted to be tightly fitted on a spindle in the magnetic recording and reproducing device, the center core attached to a magnetic disk;

inserting the magnetic disk cartridge into the magnetic recording and reproducing device;

positioning the drive pin of the magnetic recording and reproducing device in the cutaway portion of the center core wherein the drive pin avoids contact with a radially outward wall of the cutaway portion; and determining a rotational axis of the magnetic disk by engaging the spindle and the circular spindle hole, wherein the rotational axis of the magnetic disk is accurately positioned by the engagement of the spindle and circular spindle hole.

* * * * *